United States Patent
Hatori

(10) Patent No.: US 9,602,384 B2
(45) Date of Patent: Mar. 21, 2017

(54) SEMICONDUCTOR INTEGRATED CIRCUIT AND TEST METHOD THEREOF

(71) Applicant: KABUSHIKI KAISHA TOSHIBA, Tokyo (JP)

(72) Inventor: Fumitoshi Hatori, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 204 days.

(21) Appl. No.: 14/194,784

(22) Filed: Mar. 2, 2014

(65) Prior Publication Data
US 2015/0036676 A1 Feb. 5, 2015

(30) Foreign Application Priority Data

Aug. 2, 2013 (JP) ................................ 2013-161257

(51) Int. Cl.
*H04L 12/26* (2006.01)
*H04L 25/14* (2006.01)

(52) U.S. Cl.
CPC .......... *H04L 43/50* (2013.01); *H04L 43/0847* (2013.01); *H04L 25/14* (2013.01)

(58) Field of Classification Search
CPC ... H04L 1/0002; H04L 1/0025; H04L 1/0054; H04L 25/497; H04L 7/0008; H04L 1/0003; H04L 1/0041; H04L 1/0045; H04B 17/0085; H04B 17/00; H04B 17/318; H04B 1/00; H04B 17/309
See application file for complete search history.

(56) References Cited

U.S. PATENT DOCUMENTS

| 2002/0006159 A1* | 1/2002 | Wagner ................ H04B 7/0808 375/224 |
| 2008/0240166 A1* | 10/2008 | Gorday ................. H04B 1/707 370/514 |
| 2009/0067429 A1* | 3/2009 | Nagai ................. H04L 49/3009 370/392 |

FOREIGN PATENT DOCUMENTS

| JP | 2002-540747 A | 11/2002 |
| JP | 2009-065429 A | 3/2009 |

OTHER PUBLICATIONS

JP Office Action dated Jul. 22, 2016 for Application No. 2013-161257.

* cited by examiner

*Primary Examiner* — Charles C Jiang
*Assistant Examiner* — Oussama Roudani
(74) *Attorney, Agent, or Firm* — Patterson & Sheridan, LLP

(57) ABSTRACT

A semiconductor integrated circuit, operable in a normal mode and a test mode, includes a demodulator, a demodulated signal processing section, a header analysis section, a payload processing section, and a control section. The demodulator demodulates a modulated wireless signal including a synchronization pattern, header, and payload, to generate a demodulated signal. The demodulated signal processing section detects the synchronization pattern from the demodulated signal, generates a synchronization detection signal synchronized to the synchronization pattern, and converts the demodulated signal into a received bit sequence. The header analysis section extracts and analyzes the header to obtain the number of bits of the payload. The payload processing section processes the payload. The control section disables the demodulator when processing of the number of bits in the payload is completed in the normal (Continued)

mode, and disables the demodulator synchronously with a signal indicating the end of a test in the test mode.

5 Claims, 6 Drawing Sheets

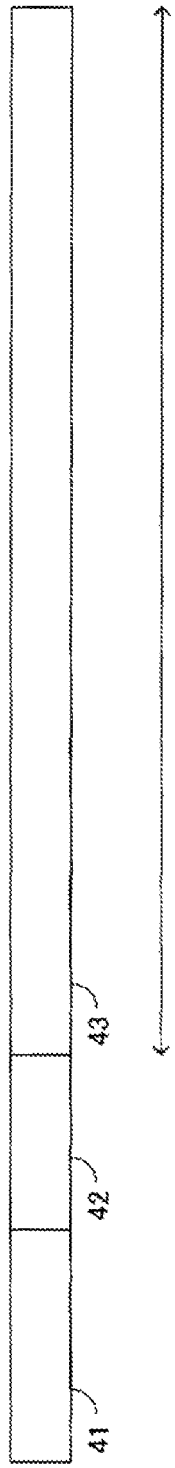
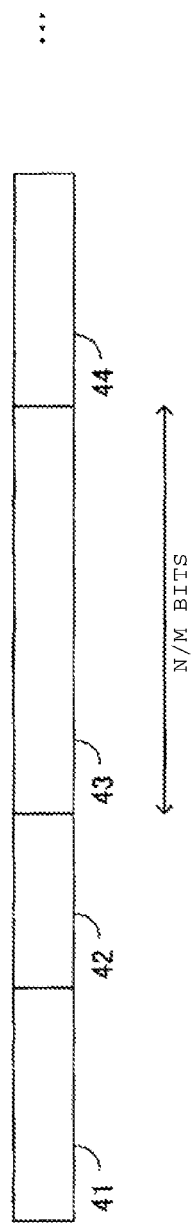
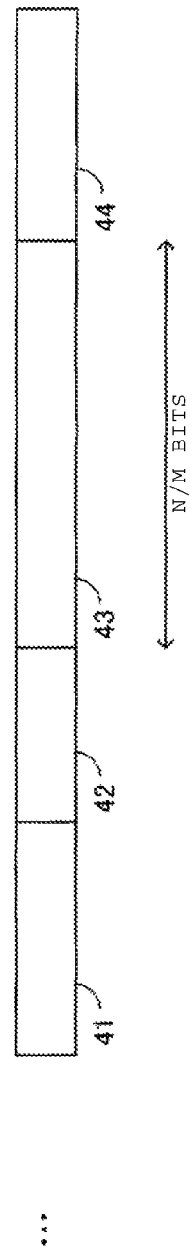
FIG. 6A  FIG. 6B

SEMICONDUCTOR INTEGRATED CIRCUIT AND TEST METHOD THEREOF

CROSS-REFERENCE TO RELATED APPLICATION

This application is based upon and claims the benefit of priority from Japanese Patent Application No. 2013-161257, filed Aug. 2, 2013, the entire contents of which are incorporated herein by reference.

FIELD

Embodiments described herein relate generally to a semiconductor integrated circuit and a test method thereof.

BACKGROUND

Bit Error Rate (BER) is one of measures of reception performance in a wireless communication apparatus. The BER is defined as a ratio between the number of error bits to the total number of bits received. The smaller the value, the better the reception performance is. In some wireless communication standards, the upper limit value of the BER is defined. And generally, reception sensitivity is defined using the value of the BER, and a test for measuring the BER needs to be performed in a screening process of manufactured products.

It is desirable to perform such a test using an operation which is as efficient as possible and close to actual operating conditions of the wireless communication apparatus.

DESCRIPTION OF THE DRAWINGS

FIGS. 6A and 6B are diagrams schematically showing packet structures of the wireless signal.

DETAILED DESCRIPTION

Embodiments provide a semiconductor integrated circuit which can perform a BER test using an operation which is efficient and close to actual operating conditions, and a test method thereof.

In general, according to one embodiment, there is provided a semiconductor integrated circuit which is operable in a normal mode to perform a normal wireless communication and in a test mode. The semiconductor integrated circuit includes a demodulator, a demodulated signal processing section, a header analysis section, a payload processing section, and a control section. The demodulator is configured to demodulate a modulated wireless signal including a synchronization pattern, a header, a payload and, in some cases, an error detecting code. The demodulated signal processing section is configured to detect the synchronization pattern from the demodulated signal, to generate a synchronization detection signal synchronized to the synchronization pattern and to convert the demodulated signal into a received bit sequence. The header analysis section is configured to extract and to analyze the header from the received bit sequence to obtain information on the payload length and the like. The payload processing section is configured to process the payload. The control section is configured to disable the demodulator when the processing of the number of bits in the payload is completed in the normal mode, and disable the demodulator synchronously with a signal indicating the end of a test in the test mode.

Hereinafter, the example embodiments are described in detail referring to drawings.

Figure 1:
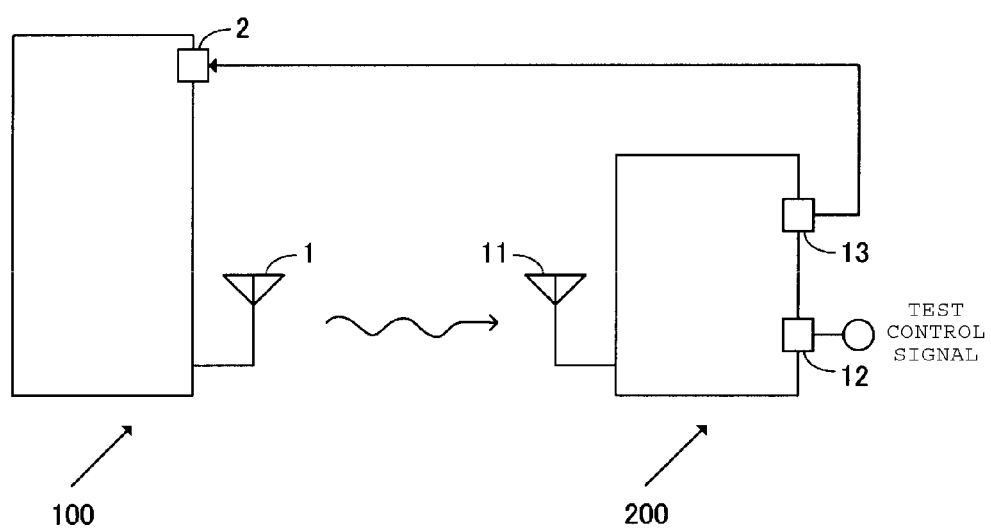
FIG. 1 is a diagram describing the outline of a BER measurement of a wireless communication apparatus using a measuring device.

First, the outline of a BER measurement method which is one of the tests for a wireless communication apparatus 200 is described. FIG. 1 is a diagram describing the outline of the BER measurement method of the wireless communication apparatus 200 where a measuring device 100 is used.

The measuring device 100 generates a wireless signal for the BER measurement, and transmits the wireless signal from an antenna 1 to the wireless communication apparatus 200.

The wireless signal for the BER measurement transmitted from the measuring device 100 is received by the antenna 11 of the wireless communication apparatus 200. According to a test control signal applied to a test control terminal 12, the wireless communication apparatus 200 is set in a normal mode for performing a normal wireless communication as a wireless communication apparatus or in a test mode for performing the BER measurement. When the wireless communication apparatus is set in the test mode, the wireless communication apparatus 200 outputs the processing result of a wireless signal from an output terminal 13 to the measuring device 100.

A signal output from the wireless communication apparatus 200 is sent to an input terminal 2 of the measuring device 100. Then, the measuring device 100 compares data which are the base of the wireless signal for the BER measurement generated by the measuring device 100 with the signal received from the wireless communication apparatus 200 to calculate the BER.

Here, the wireless communication apparatus 200 conforms to a predetermined wireless communication standard (for example, Bluetooth®). However, the wireless communication apparatus 200 may be configured to also receive a wireless signal that does not conform to the wireless communication standard. As a result, the BER measurement is efficiently performed by reducing the test time. Hereinafter, the wireless communication apparatus 200 of such a configuration is described in detail.

Figure 2:
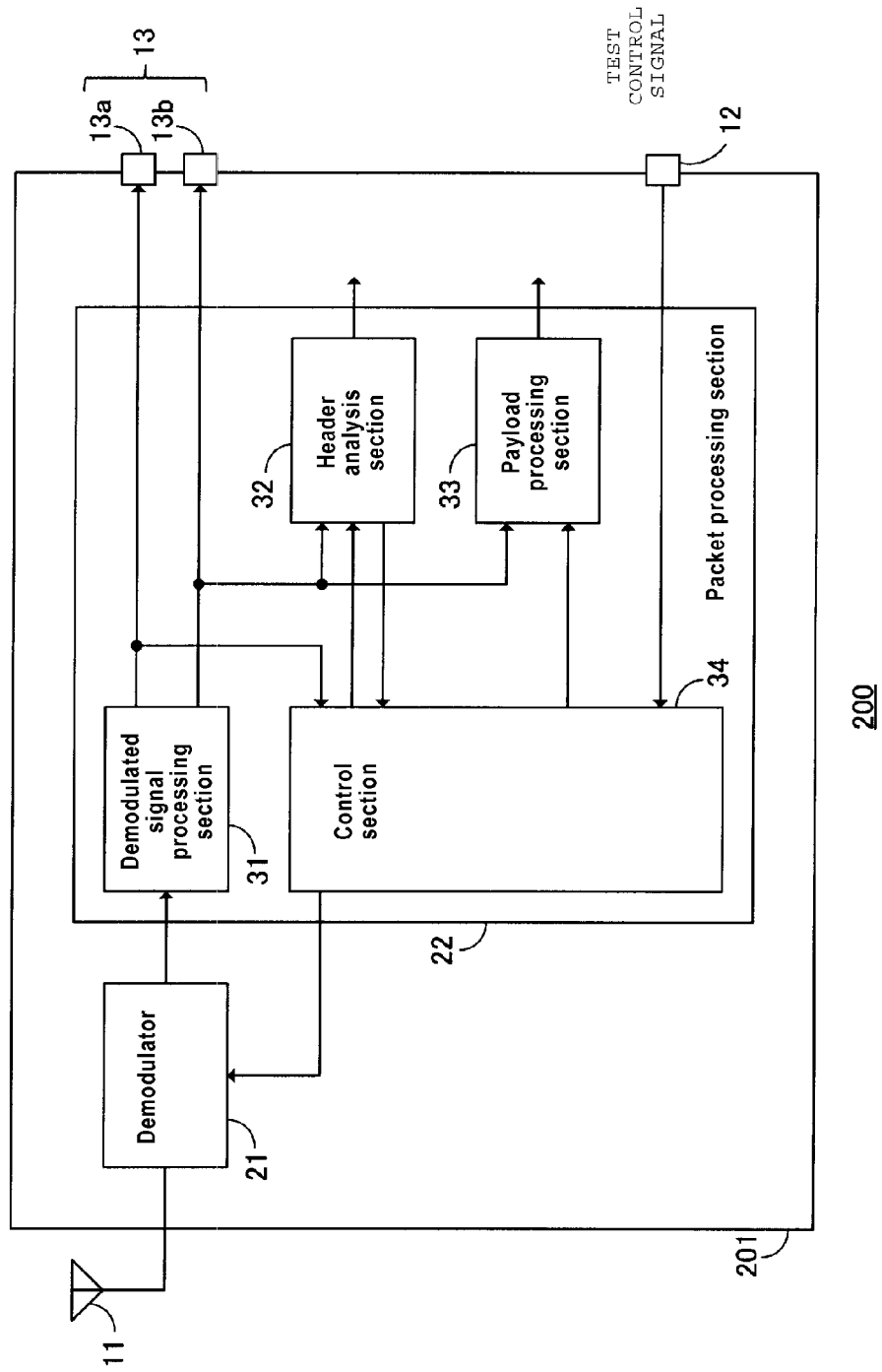
FIG. 2 is a block diagram showing the general configuration of the wireless communication apparatus.

FIG. 2 is a block diagram showing a schematic configuration of the wireless communication apparatus 200. The wireless communication apparatus 200 includes the antenna 11, a demodulator 21, and a packet processing section 22. The antenna 11 receives a wireless signal. The demodulator 21 demodulates the wireless signal received by the antenna 11 to generate a demodulated signal in an analog waveform. When the wireless communication apparatus 200 performs not only reception but also transmission, the wireless communication apparatus 200 may provide a modem function performing both modulation and demodulation instead of the demodulator 21. The packet processing section 22 processes the packet included in the demodulated signal.

For example, the demodulator 21 and the packet processing section 22 are implemented as a semiconductor integrated circuit 201. The semiconductor integrated circuit 201 includes a test control terminal 12 and output terminals 13.

As described above, a test control signal is applied to the test control terminal 12. The output terminal 13 includes a synchronization detection signal output terminal 13a and a reception bit output terminal 13b. In the test mode, the synchronization detection signal and the demodulated received bit sequence (all will be described below) are respectively output from the synchronization detection signal output terminal 13a and the reception bit output terminal 13b to the measuring device 100 of FIG. 1.

Figure 3:
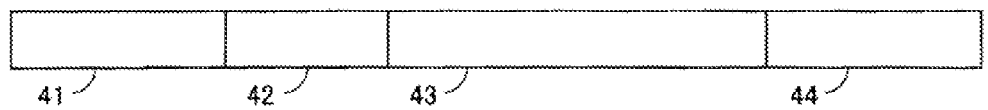
FIG. 3 is a diagram schematically showing a packet structure of a wireless signal.

FIG. 3 is a diagram schematically showing a packet structure of a wireless signal received by the wireless communication apparatus 200. The diagram represents a packet structure for performing normal wireless communication and not for the BER measurement. The packet includes a synchronization pattern 41, a header 42, a payload 43, and an error detecting code 44. However, some packets do not include the error detecting code 44 depending on a type of the packet. The synchronization pattern 41 is a field for identifying the beginning of the packet in the wireless signal. The header 42 is a field for defining the contents of the packet, the information regarding the number of bits of the payload 43 and the like. The payload 43 is a field that includes the body of the data. The error detecting code 44 is a field for error detection.

A wireless signal is generated by modulating such a packet including the synchronization pattern 41, the header 42, the payload 43, and the error detecting code 44.

The number of bits of the synchronization pattern 41, the header 42, and the error detecting code 44 are defined by the wireless communication standard. In addition, the number of bits in the payload 43 is stored in the header 42, and the maximum number of bits of the payload 43 is defined by the wireless communication standard. Thus, the normal wireless communication apparatus 200 is configured to receive the number of bits of the payload 43 indicated by the header 42 and it is sufficient for the apparatus 200 to be able to handle packets with length up to the maximum number of bits of the payload 43.

On the other hand, the wireless communication apparatus 200 according to the embodiment can handle the payload 43 with substantially unlimited number of bits without being constrained by the number of bits of the payload 43 indicated by the header 42 and the maximum bit number of the payload 43 defined by the wireless communication standard. Hereinafter, the packet processing section 22 is described in more detail.

As shown in FIG. 2, the packet processing section 22 includes a demodulated signal processing section 31, a header analysis section 32, a payload processing section 33, and a control section 34.

Figure 4:
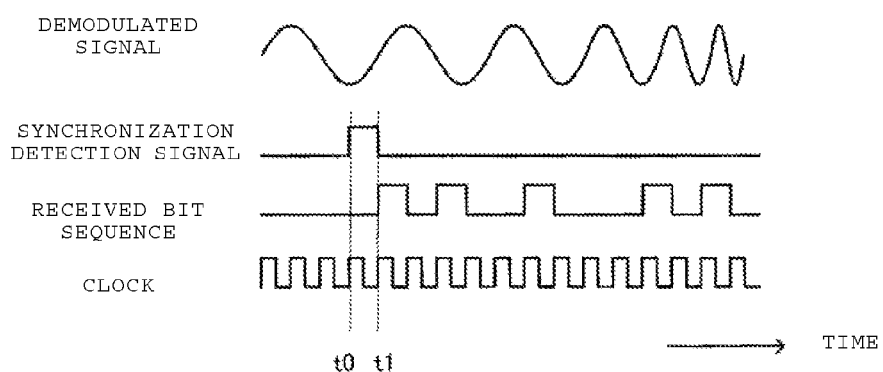
FIG. 4 is a waveform diagram describing a processing operation of a demodulated signal processing section.

FIG. 4 is a waveform diagram describing a processing operation of the demodulated signal processing section 31. The demodulated signal generated by the demodulator 21 is an analog waveform as shown in the diagram. After converting the analog waveform into a digital signal by an analog to digital converter, the demodulated signal processing section 31 processes the digital signal to search for the synchronization pattern 41 including a predetermined pattern. Then, when the synchronization pattern 41 is detected (time t0 of FIG. 3), the demodulated signal processing section 31 generates a synchronization detection signal in a pulse waveform which is synchronized to the synchronization pattern 41 and starts processing of an AD converted demodulated signal to generate a received bit sequence synchronized to a clock signal (after time t1 in FIG. 3). The received bit sequence corresponds to the header 42, the payload 43 and the error detecting code 44 in the packet.

During the process in which the wireless communication apparatus 200 processes a reception signal, an S/N ratio (Signal to Noise ratio) of the demodulated signal itself deteriorates due to variation of elements, a noise signal, and the like, and as a result there is a possibility that an error occurs in the received bit sequence. The BER is defined as an error rate of this received bit sequence. Then, the value of the BER is used as an indicator of reception performance of the wireless communication apparatus 200.

Returning to FIG. 2, the synchronization detection signal is supplied to the control section 34. The received bit sequence is supplied to the header analysis section 32 and the payload processing section 33. In addition, the synchronization detection signal and the received bit sequence are respectively output from the synchronization detection signal output terminal 13a and the reception bit output terminal 13b to the measuring device 100 of FIG. 1 in the test mode.

The header analysis section 32 extracts and analyzes the header 42 from the received bit sequence in the normal mode to supply information such as the number of bits in the payload 43 and the like to the control section 34. In addition, the header analysis section 32 transfers data of the header 42 to a memory buffer (not shown) after the completion of reception of a header portion in the normal mode.

The payload processing section 33 extracts and processes the payload 43 from the received bit sequence in the normal mode to transfer the data of the payload 43 to the memory buffer (not shown). More specifically, the payload processing section 33 collects the serial bit data into a unit data with predetermined data format (for example, 8 bits) and transfers the unit data into the memory buffer.

However in the test mode, the header analysis section 32 and the payload processing section 33 may not operate like in the normal mode.

In the control section 34, a test control signal is applied to the test control terminal 12. The test control signal controls the mode of the wireless communication apparatus 200 and puts it in the normal mode or the test mode. The test control signal is also used to control the start and the end of measurement of the BER.

For example, when a power supply voltage is applied to the test control terminal 12, the wireless communication apparatus 200 is set in the test mode. Alternatively, when a test mode command defined on a serial interface, the mode control can be performed through the serial interface (not shown) from an external host device.

The control section 34 controls the demodulator 21, the header analysis section 32, and the payload processing section 33 after setting the wireless communication apparatus 200 in the normal mode or the test mode.

Figure 5:
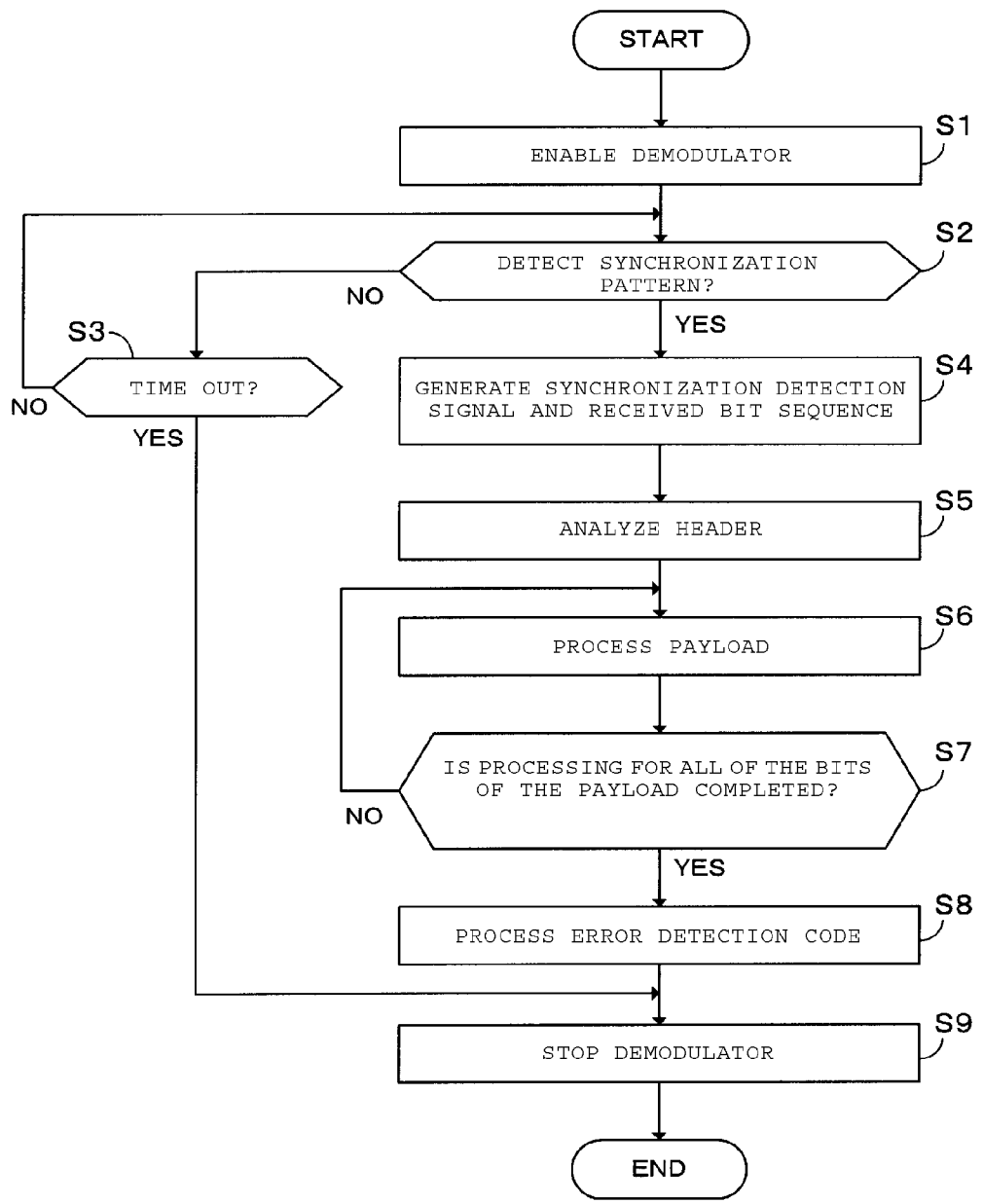
FIG. 5 is a flowchart showing an example of a processing operation of the wireless communication apparatus in a normal mode.

FIG. 5 is a flowchart showing an example of the processing operation of the wireless communication apparatus 200 in the normal mode. First, the control section 34 enables the demodulator 21 (step S1) to start receiving a wireless signal. Accordingly, the demodulator 21 processes the received wireless signal to generate a demodulated signal.

When the synchronization pattern 41 is not detected in a predetermined time (NO in step S2, YES in step S3), the wireless communication apparatus 200 disables the demodulator 21 and performs a ramp down processing (step S9).

On the other hand, when the synchronization pattern 41 is detected before timeout (YES in step S2), the demodulated signal processing section 31 generates the synchronization detection signal and starts the generation of the received bit sequence, which is formatted as binary data (step S4). The synchronization detection signal is supplied to the control section 34, and the received bit sequence is supplied to the header analysis section 32 and the payload processing section 33.

Subsequently, the control section 34, which receives the synchronization detection signal, controls the header analysis section 32, and the header analysis section 32 extracts the header 42 following the synchronization pattern 41 from the received bit sequence. Then, the header analysis section 32 analyzes the header 42 and obtains the number of bits of the payload 43 (step S5). Information of the number of bits in the payload 43 is supplied to the control section 34. Then, the number of bits of the payload 43 is given to the payload processing section 33.

Subsequently, the payload processing section 33 extracts and processes the payload 43 from the received bit sequence (step S6). Data of the processed payload 43 are stored in the memory buffer. The payload processing section 33 continues the processing of the payload 43 until it reaches the end of the packet, which is notified by the control section 34 as the number of bits of the payload 43 (NO in step S7).

After completion of the processing of the payload 43 with length of the number of bits of the payload 43 (YES in step S7), the error detecting code is also processed if the packet has the error detecting code (step S8) and the control section 34 disables the demodulator 21 and ends reception (step S9).

As described above, in the normal mode, information indicating the number of bits of the payload 43 included in the header 42 is extracted and the payload 43 is processed until the number of processed bits of the payload 43 reaches the number of bits of the payload 43 extracted from the header 42. If a fixed length packet is defined in a wireless communication standard and the packet is received, the payload processing section 33 processes the payload 43 until the processed bits of the payload 43 reaches the fixed length.

In contrast, in the test mode described below, the payload 43 is processed without being constrained by the number of bits of the payload that is included in the header 42 or defined by the wireless communication standard.

Hereinafter, the test mode is described. If the necessary length of a random data series such as Pseudo Random Bit Stream (PRBS9) for the BER measurement is N bits, the number of bits of the payload 43 is required to be at least N bits (as further specified below). For example, when measuring the BER of nearly 0.1%, it is necessary to detect an error from 1,000 bits, and N is required to be ten to tens of thousands of bits to perform an accurate measurement. However, according to the general wireless communication standard, this data length exceeds the maximum length of the payload that can be transmitted in one packet.

FIG. 6A is a diagram schematically describing the packet structure of the wireless signal for the BER measurement. As illustrated, in the embodiment, it is possible to increase the number of bits of the payload 43, and more specifically, to increase the number of bits of the payload 43 over the maximum bit length defined by the wireless communication standard. As described below, this is because the wireless communication apparatus 200 is configured to receive a substantially unlimited number of bits for the payload 43. In addition, the error detecting code 44 may be omitted. As shown in FIG. 6A, a wireless signal which is obtained by modulating the synchronization pattern 41, the header 42, and the payload 43 as shown in FIG. 6A is used for the BER measurement.

Suppose that the wireless communication apparatus 200 can only treat packets defined by the wireless communication standard. When the maximum bit number defined by the wireless communication standard is N/M, as shown in FIG. 6B, there is no choice but to split the payload data used for the BER measurement into M separate packets. In this case, the synchronization pattern 41, the header 42, and the error detecting code 44 are included respectively in each of the M packet signals. As a result, compared to the case when the length of the payload 43 is set to N bits as shown in FIG. 6A, the total bit number of the wireless signal for the BER measurement is increased in FIG. 6B. Furthermore, it is necessary to have a fixed time interval between a packet and a subsequent packet. Therefore, time required for a test becomes longer.

In contrast, in the exemplary embodiment, reception is possible even when the payload 43 is set to N bits, and as a result the synchronization pattern 41 and the header 42 necessary for the measurement is one. Therefore, it is possible to reduce the total bit number of the wireless signal for the BER measurement, and thereby time for the test can be reduced.

Figure 7:
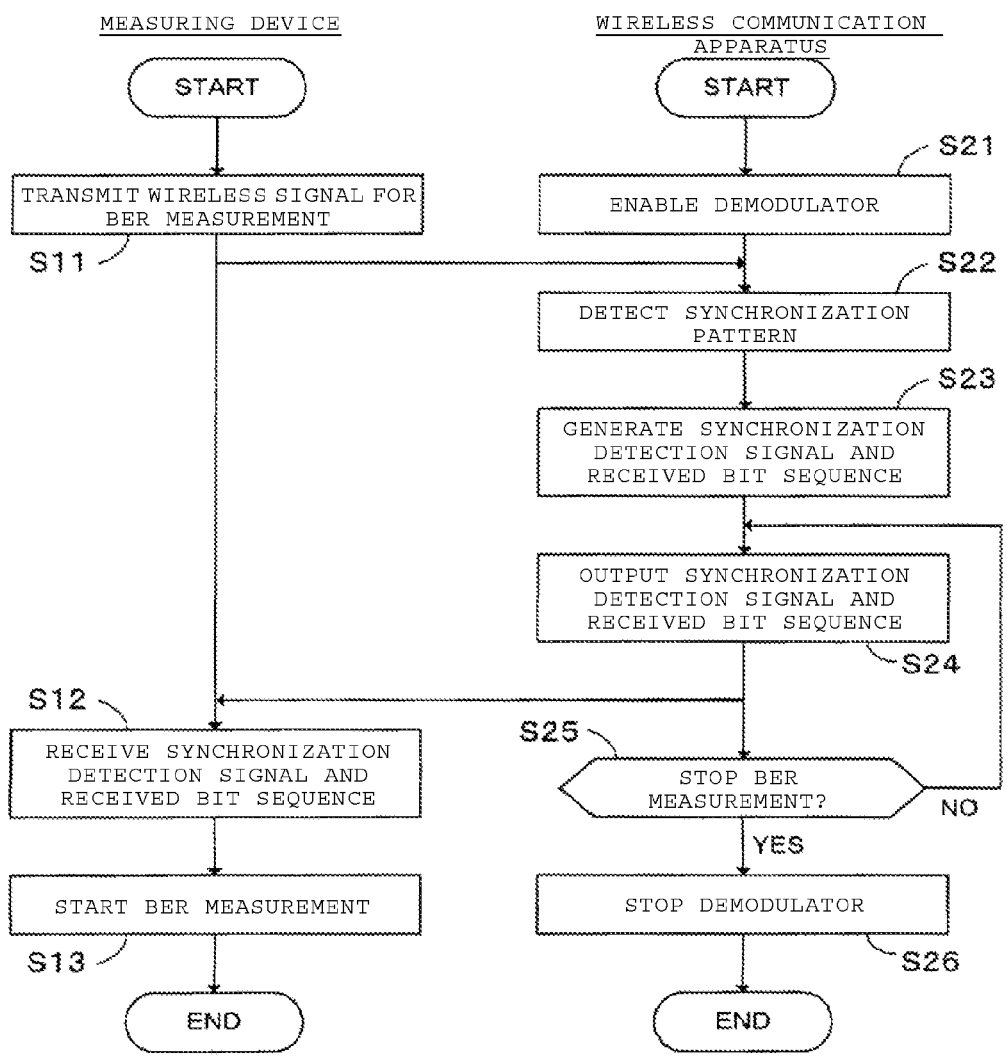
FIG. 7 is a sequence diagram showing an example of the processing operation of the measuring device and the wireless communication apparatus in a test mode.

FIG. 7 is a sequence diagram showing an example of a processing operation of the measuring device 100 and the wireless communication apparatus 200 in the test mode.

First, the measuring device 100 generates a wireless signal for the BER measurement as shown in FIG. 6A and transmits the wireless signal to the wireless communication apparatus 200 (step S11). Prior to the transmission of the wireless signal, the control section 34 of the wireless communication apparatus 200 enables the demodulator 21 to start receiving the wireless signal (step S21). Accordingly, the demodulator 21 processes the wireless signal for the BER measurement to generate a demodulated signal.

Then, the demodulated signal processing section 31 detects the synchronization pattern 41 from the demodulated signal (step S22). When the synchronization pattern 41 is detected, the demodulated signal processing section 31 generates the synchronization detection signal and starts generating the received bit sequence (step S23). The received bit sequence corresponds to the header 42 and the payload 43 shown in FIG. 6A.

In the test mode, the demodulated signal processing section 31 sends the synchronization detection signal and the received bit sequence respectively from the synchronization detection signal output terminal 13a and the reception bit output terminal 13b to the measuring device 100 (step S24). Accordingly, the measuring device 100 receives the synchronization detection signal and the received bit sequence (step S12). The header analysis section 32 of the wireless communication apparatus 200 may not analyze the header 42.

Then, unlike the flowchart of the normal mode shown in FIG. 5, as long as a test control signal, which stops the BER measurement, is not applied (NO in step S25), the demodulated signal processing section 31 continues generating the received bit sequence and sending the received bit sequence to the measuring device 100. That is, the demodulated signal processing section 31 continues processing the demodulated signal even when the processed payload bit exceeds the number of bits of the payload 43 carried in the header 41 or the maximum number of bits of the payload 43 defined in the wireless communication standard.

When the transmission of the wireless signal for the BER measurement by the measuring device 100 ends, the test control signal, which stops the BER measurement, is applied to the wireless communication apparatus 200 (YES in step S25). In response to the test control signal, the control section 34 disables the demodulator 21 (step S26).

On the other hand, the measuring device 100 starts measurement of the BER in synchronization with the synchronization detection signal (step S13). More specifically, after receiving a pulse of the synchronization detection signal, the measuring device 100 starts comparing the received bit sequence received from the wireless communication apparatus 200 with the corresponding original data generated by the measuring device 100 and calculates a ratio between the number of error bits and the total number of bits of the payload 43 after receiving the last bit of the payload 43.

Thus, in the embodiment, the wireless communication apparatus 200 in the test mode can receive the payload 43 with a substantially unlimited number of bits. Therefore, it is possible to use arbitrarily long payload 43 in the wireless signal for the BER measurement and to perform the BER measurement efficiently by reducing the test time. In addition, even in the test mode, the demodulator 21 and the demodulated signal processing section 31 operate in the same manner as in the normal mode. Therefore, it is possible to measure the BER using an operation close to actual operating conditions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the concept of the inventions. The accompanying claims and their equivalents are intended to cover such forms or modifications as would fall within the scope and spirit of the inventions.

What is claimed is:

1. A semiconductor integrated circuit which is operable in a normal mode to perform a normal wireless communication and in a test mode, the semiconductor integrated circuit comprising:
    a demodulator configured to demodulate a modulated wireless signal including a synchronization pattern, a header, and a payload, to generate a demodulated signal while the semiconductor integrated circuit is operating in the normal mode and in the test mode;
    a demodulated signal processing section configured to detect the synchronization pattern from the demodulated signal, generate a synchronization detection signal synchronized to the synchronization pattern, and convert the demodulated signal into a received bit sequence, while the semiconductor integrated circuit is operating in the normal mode and in the test mode;
    a header analysis section configured to extract and analyze the header from the received bit sequence to obtain the number of bits of the payload while the semiconductor integrated circuit is operating in the normal mode and in the test mode;
    a payload processing section configured to process the payload while the semiconductor integrated circuit is operating in the normal mode and in the test mode; and
    a control section configured to disable the demodulator responsive to a first condition being satisfied while the semiconductor integrated circuit is operating in the normal mode and responsive to a second condition being satisfied while the semiconductor integrated circuit is operating in the test mode, and to not disable the demodulator while the semiconductor integrated circuit is operating in the test mode even when the first condition is met, wherein
    the first condition is met when the payload processing section completes processing of the payload in an amount equal to the number of bits of the payload extracted by the header analysis section, and the second condition is met when control signal indicating the end of a test is applied.

2. The circuit according to claim 1, wherein the control section is configured to set the semiconductor integrated circuit to operate in the test mode upon receipt of a control signal indicating the start of the test, and set the semiconductor integrated circuit to operate in the normal mode upon receipt of the control signal indicating the end of the test.

3. The circuit according to claim 1,
    wherein the semiconductor integrated circuit is configured as a wireless communication apparatus that conforms to a predetermined wireless communication standard, and
    wherein the semiconductor integrated circuit is capable of receiving, in the test mode, a wireless signal including a payload longer than the maximum bit length of the payload defined by the wireless communication standard.

4. The circuit according to claim 3, wherein the wireless signal includes the synchronization pattern, the header, and the payload longer than the maximum bit length of the payload defined by the wireless communication standard.

5. The circuit according to claim 2, further comprising:
    a test terminal to which the control signal indicating the start of the test, and the control signal indicating the end of the test are applied.

* * * * *